United States Patent [19]

Asano

[11] Patent Number: 4,686,578
[45] Date of Patent: Aug. 11, 1987

[54] GII/GIII TRANSMISSION SYSTEM
[75] Inventor: Hideo Asano, Machida, Japan
[73] Assignee: International Business Machines Corporation, Armonk, N.Y.
[21] Appl. No.: 672,011
[22] Filed: Nov. 16, 1984
[30] Foreign Application Priority Data
   Nov. 22, 1983 [JP]  Japan ................................ 58-218870
[51] Int. Cl.$^4$ .............................................. H04N 1/40
[52] U.S. Cl. .................................. 358/280; 358/257; 358/285; 358/260
[58] Field of Search ............... 358/256, 257, 280, 282, 358/288, 293, 294, 260

[56]                References Cited
              U.S. PATENT DOCUMENTS
   3,973,079  8/1976  Fukimuki et al. .................... 358/260
   4,366,506 12/1982  Ejiri et al. ............................ 358/280

Primary Examiner—Edward L. Coles, Sr.
Attorney, Agent, or Firm—John J. Goodwin

[57]                   ABSTRACT

A document is moved across a scanner unit and successive PEL lines are scanned. Reflected light from the document with the high PEL density produces binary signal 1 or 0 in accordance with the amount of the reflected light received by the scanner. The PEL data of binary 1 or 0 of one PEL line are serially supplied to a serial parallel conversion circuit, which converts the input serial data to a parallel data and supplies the parallel data to a two PEL line buffer. The two PEL line buffer stores PEL data of the succeeding two PEL lines. Sample windows are set up and the size of the sample windows is selected as equal to the PEL size. The sample windows enclose four bits which are used to access a conversion table. The four bits in the sample window produce sixteen combinations of the white or black PELs. The conversion table stores sixteen data or entries which represent degree of amplitude modulation for the carrier signal of the transmission mode. A modulator within the system modulates the amplitude of the carrier signal of the transmission mode using AM-PM-VSB, in accordance with the bit combination sampled by the sample window, such as by the distribution status or the position of black or white high density PELs enclosed by the sample window.

10 Claims, 10 Drawing Figures

FIG. 1a

| P11 | P12 | P13 | P14 | P15 | P16 |
|---|---|---|---|---|---|
| P21 | P22 | P23 | P24 | P25 | P26 |
| P31 | P32 | P33 | P34 | P35 | P36 |
| P41 | P42 | P43 | P44 | P45 | P46 |

1 PEL

FIG. 1b

| Pa | Pb | Pc | Pd |
|---|---|---|---|
| Pe | Pf | Pg | Ph |

1 PEL

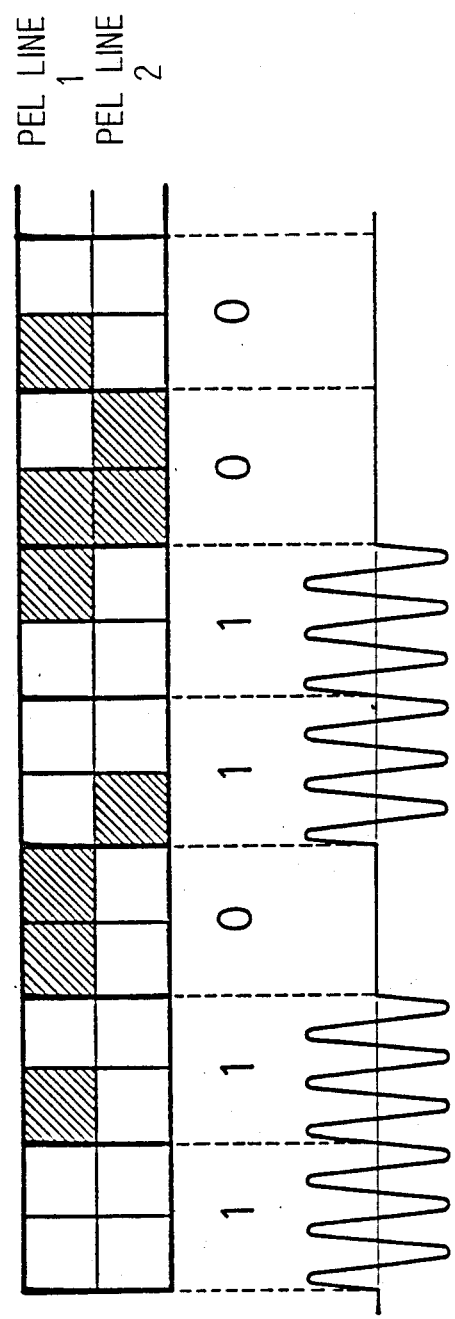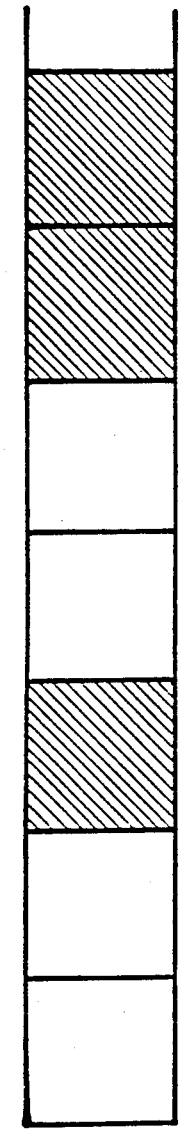
FIG. 2a  FIG. 2b  FIG. 2c

GII/GIII TRANSMISSION SYSTEM

DESCRIPTION

1. Field of the Invention

The invention relates to a system and a method for transmitting data representing PELs of an image, in which size of said PEL is smaller than size of PEL in digital GII transmission mode through GII transmission system using vestigial side band amplitude modulation-phase modulation (AM-PM-VSB), with maintaining all PEL information of the image.

2. Background of the Invention

The AM-PM-VSB has been recommended by C.C.I.T.T. for a facsimile transmission mode for the GII mode facsimile terminal. The AM-PM-VSB uses an amplitude modulation which modulates amplitude of a carrier signal in accordance with an amplitude of input signal, a phase modulation which inverts a phase when an amplitude of input signal equals to zero, and vestigial side-band (VSB) system.

Digital facsimile terminal which is capable of operating in both GII mode and GIII mode has been recently developed. Scan density in the GII mode, i.e., the number of scan lines per mm in a subscan or vertical direction, is 3.85 lines/mm, and scan density in the GIII mode is 7.7 lines/mm. The GII/GIII digital facsimile terminal has a scanner unit which includes a large number of scanning elements arranged in a line along a main scan or horizontal direction. Typical device used as the scanner unit is CCD (Charge Coupled Device) scanner unit. To accommodate the GIII operational mode with the scan density of 7.7 scan lines/mm, CCD elements are horizontally arranged with a density of 8 elements/mm, thus each CCD element defines one PEL of $\frac{1}{8}$ mm $\times 1/7.7$ mm, as shown in (a) of FIG. 1.

Amplitude signals from the CCD elements representing amount of reflected light from the original document are processed by the facsimile terminal. In the GIII mode, the facsimile terminal handles the $\frac{1}{8}$ mm $\times 1/7.7$ mm PEL as one GIII PEL, as shown in (a) of the FIG. 1. In the GII mode, the facsimile terminal handles the four GIII PELs as one GII PEL, as shown in (b) of the FIG. 1. That is, one GII PEL includes four GIII PELs. The GII/GIII digital facsimile terminal changes the size of PEL in response to the selected operational mode.

In the GIII mode facsimile operation, all PELs, i.e., $P_{11}$, $P_{12}$, $P_{13}$ ..., $P_{21}$, $P_{22}$, $P_{23}$, ..., $P_{31}$, $P_{32}$, $P_{33}$ ..., and $P_{41}$, $P_{42}$, $P_{43}$ ..., are transmitted from transmitter facsimile terminal to receiver facsimile terminal through transmission line. The receiver facsimile terminal reproduces the all PELs, $P_{11}$, $P_{12}$, $P_{13}$, ..., $P_{21}$, $P_{22}$, $P_{23}$, etc. of the original facsimile document. For the GII mode facsimile operation, PEL size is defined as $\frac{1}{4}$ mm $\times 1/3.85$ mm, e.g., PELs $P_a$, $P_b$, $P_c$, ..., etc., shown in (b) of the FIG. 1. The PEL $P_a$ in the GII mode includes the PELs $P_{11}$, $P_{12}$, $P_{21}$ and $P_{22}$. The binary value, i.e., 1 or 0, of the GII mode PEL $P_a$ is determined by, for example, a decision by majority of black PELs of the four GIII mode PELs $P_{11}$, $P_{12}$, $P_{21}$ and $P_{22}$. Referring to (a) of FIG. 2, one example of a distribution pattern of the black and white PELs of PEL line 1 and PEL line 2, which is detected by the scanner unit is shown. PEL size in the GII mode operation is shown by thick lines which form large GII mode PELs. Each GII mode PEL contains the four GIII mode PELs. First, second, fourth and fifth GII mode PELs are determined as white level, i.e., binary 1, while third, sixth and seventh GII mode PELs are determined as black level, i.e., 9 binary 0, due to the decision by majority. Waveform of the transmitted signal is shown in (b) of the FIG. 2. Amplitude of the carrier signal is modulated in accordance with the determined binary values for each GII PEL. Reproduced image at the receiver facsimile terminal is shown in (c) of the FIG. 2. Comparing with the reproduced image (c) with the scanned image (a) of the FIG. 2, it is apparent that the reproduced image in the GII mode operation lacks the details of the scanned image, in spite of that the scanner unit provides the detailed GIII PEL image (a) of the FIG. 2.

DESCRIPTION OF THE INVENTION

The invention resolves the above problem. In other words, the invention can transmit the detailed PEL information which was lost in the above prior technology, through the GII transmission line. Reproduced image at the receiver facsimile terminal transmitted through the transmission line using AM-PM-VSB of the GII mode, in accordance with the present invention, correctly reproduces the scanned PEL images (a) of the FIG. 2.

The large size PELs, e.g., $P_a$, $P_b$, etc., are GII PELs of the GII transmission mode using AM-PM-VSB, and the scanned PELs, e.g., $P_{11}$, $P_{12}$, etc., are small size PELs which are PELs of higher density than that of the GII transmission mode using AM-PM-VSB. It is also noted that although the one GII PEL is indicated as it has four GIII mode PELs, the PEL of the transmission mode using AM-PM-VSB could include more PELs than four, such as nine PELs, sixteen PELs.

The invention provides method for transmitting data representing PELs of an image, in which size of said PEL is smaller than size of PEL in digital GII transmission mode through GII transmission system using AM-PM-VSB. The method is characterized by the steps of;

scanning said image for producing PEL data representing white or black level of said small size PELs of said image;

sampling said PEL data by a sample window which equals to said size of PEL in digital GII transmission mode;

detecting position of white or black PEL data in said sample window; an modulating amplitude of carrier signal of said GII transmission system in response to said detected position.

DESCRIPTION OF THE DRAWINGS

FIGS. 1a–b show the high density PEL and PEL of the transmission mode using AM-PM-VSB.

FIGS. 2a–b show the transmission and the reproduction of the high density PEL (small size PEL) image through the prior standard transmission system using AM-PM-VSB.

DESCRIPTION OF THE PREFERRED EMBODIMENT

Figure 3:
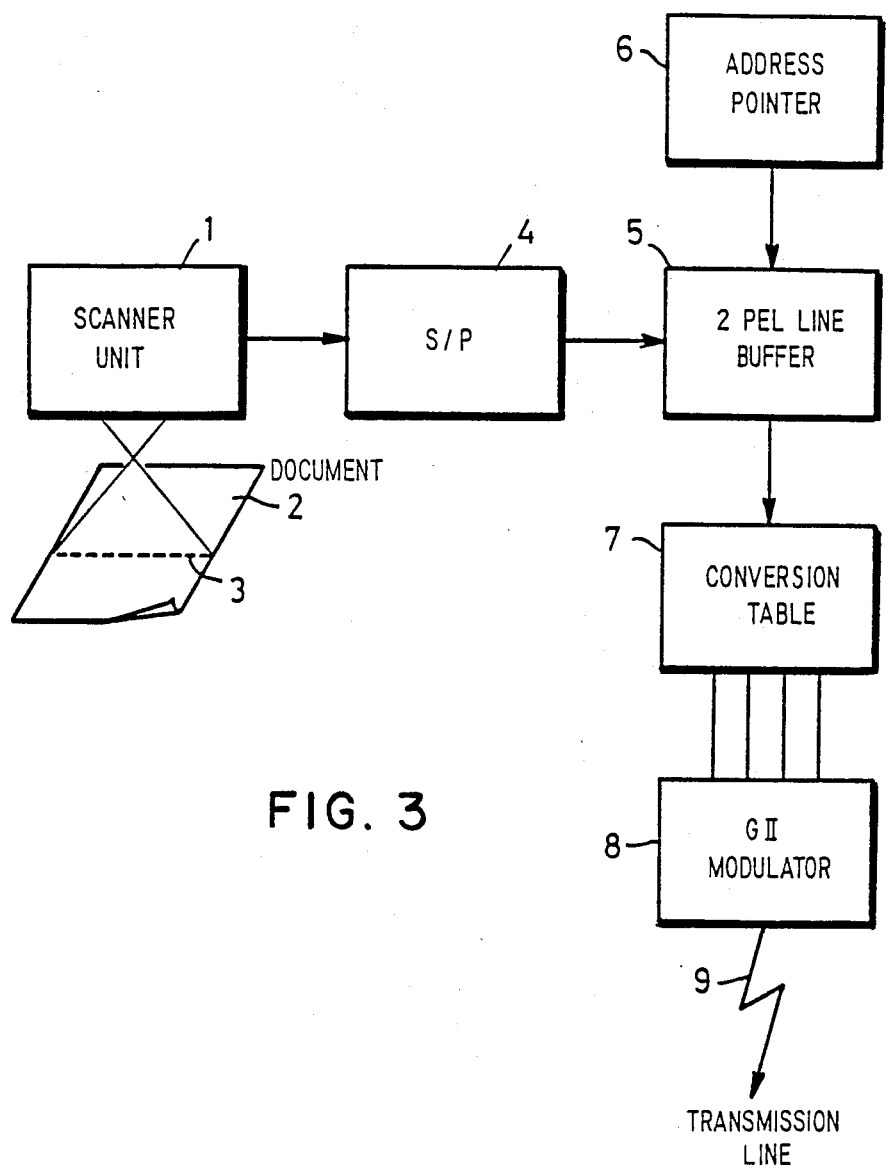
FIG. 3 shows the circuit block for the GII mode operation in the transmitter facsimile terminal.

Referring to FIG. 3, block diagram operated for the GII mode in the transmitter facsimile terminal is shown. An original document 2 is moved across a scanner unit 1, e.g., CCD scanner unit. Successive PEL lines 3 are scanned as the movement of the document 2. The scanner unit 1 detects reflected light from the document 2 with the high PEL density or resolution of the GIII mode, i.e., $\frac{1}{8}$ mm × 1/7.7 mm, and produces binary signal 1 or 0 in accordance with the amount of the reflected light. The PEL data of binary 1 or 0 of one PEL line are serially supplied to serial parallel conversion circuit 4, which converts the input serial data to a parallel data and supplies the parallel data to two PEL line buffer 5.

The two PEL line buffer 5 stores PEL data of the succeeding two PEL lines. Example of the two PEL line data stored into the 2 line buffer 5 is shown in (a) of FIG. 4, which is selected to be the same as that shown in (a) of the FIG. 2, for the sake of understanding the invention.

The sample window 21 is set up by address pointer 6. The size of the sample window 21 is selected as equals to the PEL size of the GII transmission mode, i.e., $\frac{1}{4}$ mm × 1/3.85 mm.

First sample window samples PEL group 1, second sample window samples PEL group 2, third sample window samples PEL group 3, and so on. The address pointer 6 sequentially addresses bit positions in the two PEL line buffer 5 to shift the sample window through the two line buffer 5.

The four bits enclosed by the sample window 21 are used to access conversion table 7. The four bits in the sample window produce sixteen combinations of the positions of white or black PELs. The conversion table 7 stores sixteen data or entries (A)-(P) which represent degree of amplitude modulation for the carrier signal of the transmission mode using AM-PM-VSB.

Figure 5:
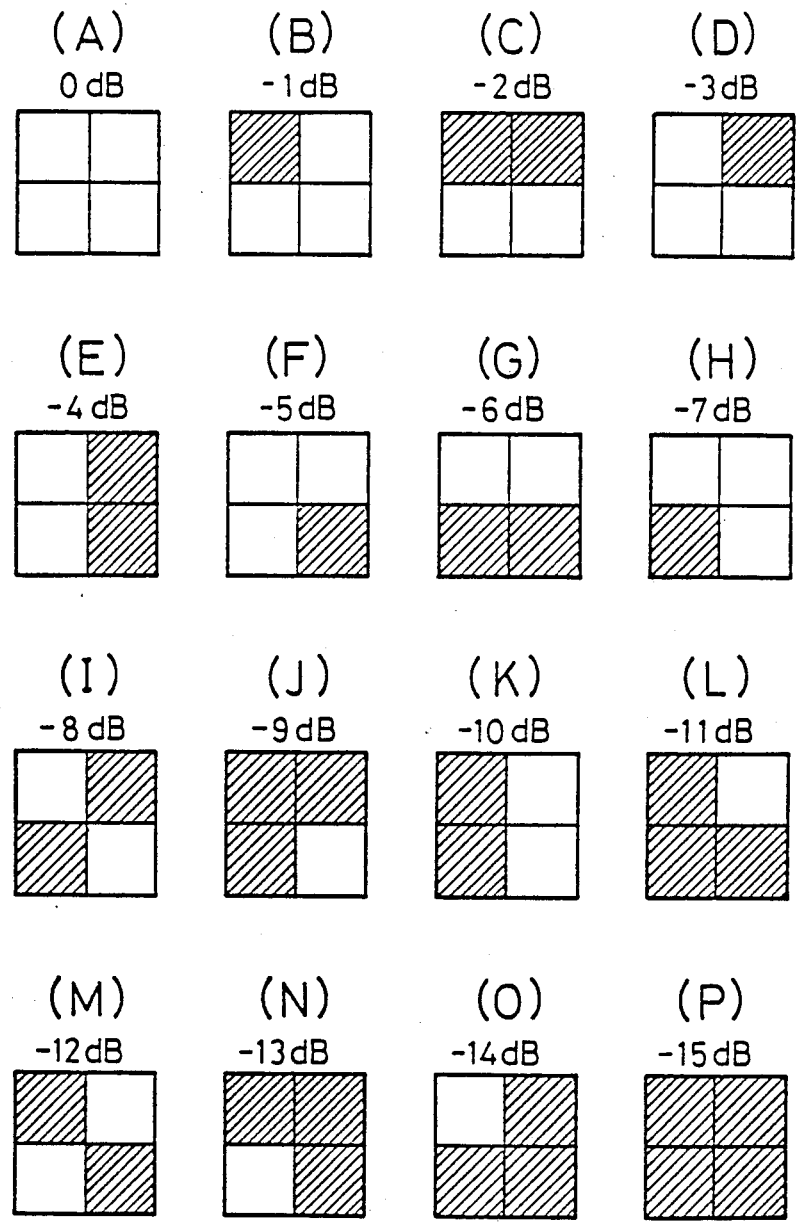
FIGS. 5A-P shows the sixteen sub-ranges of the amplitude which are assigned to the sixteen combinations of white or black PELs in the sample window, respectively.

Describing the amplitude modulation, the output signal in the GII mode varies between 0 dB and −26 dB, and 0 dB signal could be deemed as white signal and −26 dB signal could be deemed as black signal, in accordance with C.C.I.T.T. proposal T3. In this embodiment, the range 0 dB ∼ −15 dB is selected. The range 0 dB ∼ −15 dB is equally divided into the sixteen sub-ranges, and these sixteen sub-ranges are shown in the FIG. 5 as entries (A)-(P). And, the sixteen combinations of white or black PELs, as described above, are assigned to the sixteen sub-ranges, respectively, as shown in the FIG. 5.

Returning to the FIG. 4, the PEL group 1 has all white bits. These four bits "IIII" are supplied to the conversion table 7 to access the entry (A), shown in the FIG. 5, which indicates "0 dB", which is applied to GII modulator 8 to control the degree of the amplitude modulation of the carrier signal to "0 dB". The PEL group 2 is used to control the degree of the amplitude modulation to "−1 dB", and so on, as shown in (b) of the FIG. 4.

As apparent from the above description, the invention finely modulates the amplitude of the carrier signal of the transmission mode using AM-PM-VSB, in accordance with the bit combination sampled by the sample window 21, i.e., the distribution status or the position of black or white high density PELs enclosed by the sample window 21.

Figure 4A:
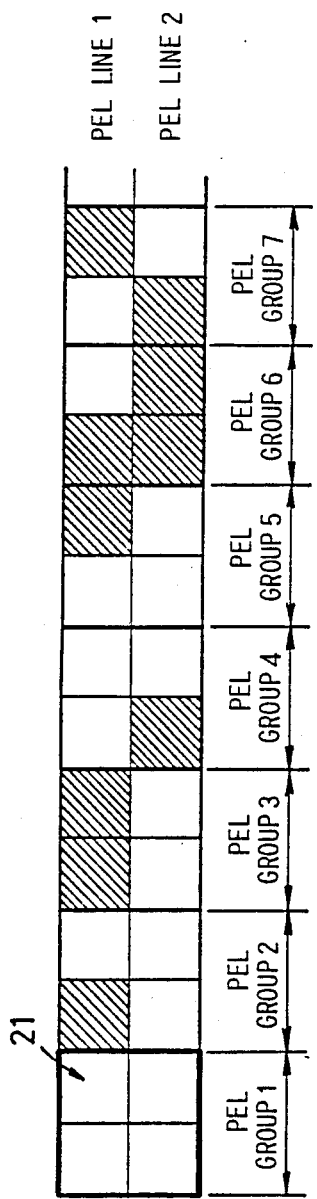
FIG. 4a–b shows the waveform modulated in accordance with the invention for transmitting the high density PEL image through the transmission line using AM-PM-VSB.
Figure 4B:
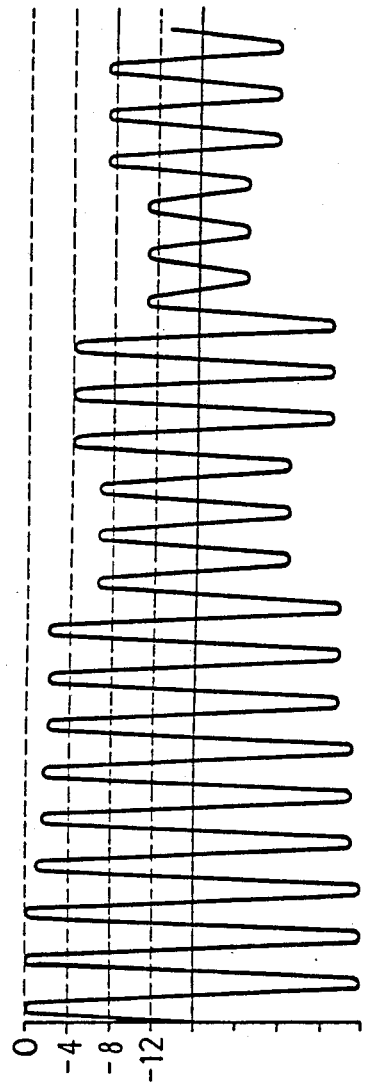
Figure 6:
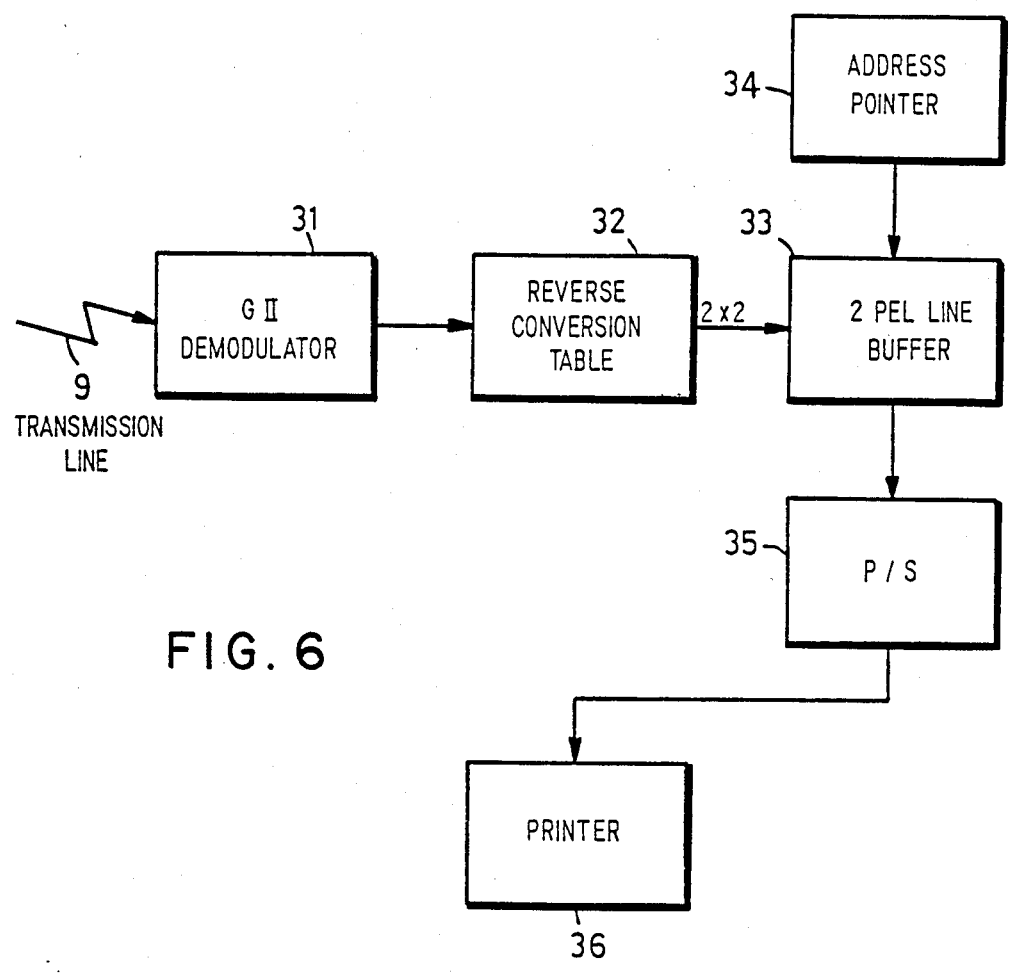
FIG. 6 shows the circuit block for the GII mode operation in the receiver facsimile terminal.

Referring to FIG. 6, circuit block diagram in the receiver facsimile terminal is shown. The transmitted signal with the amplitude modulation as shown in (b) of the FIG. 4 is supplied to GII demodulator 31. The GII demodulator 31 detects amplitude of the received signal and produces one of sixteen level signals at its output in accordance with the detected amplitude of the received signal. The signal is applied to reverse conversion table 32, which stores sixteen PEL groups as shown in the FIG. 5, and is used to fetch one of the sixteen PEL groups. The PEL groups sequentially supplied from the table 32 are assembled in 2 PEL line buffer 33 under the control of address pointer 34, so that the two PEL lines of the original document image shown in (a) of the FIG. 4 are reproduced in the 2 PEL line buffer 33. The address pointer 34 sequentially addresses bit positions in the two PEL line buffer 33 to sequentially store the four bit-PEL groups supplied from the reverse conversion table 32 into the two PEL buffer 33. The assembled two PEL lines are supplied to printer 36 through parallel-serial conversion circuit 35 to print the original document image on a recording sheet.

For the sake of the understanding of the invention, the exemplary range 0 dB ∼ −15 dB has been described. Taking into account noise problem in the transmission line, another range, such as −3 dB ∼ −18 dB, −4 dB ∼ −19 dB, could be used.

Having thus described my invention, what I claim as new, and desire to secure by Letters Patents is:

1. A method for transmitting data representing PELs of an image each of said PELs having a given size, in which said size of said PEL is smaller than the size of a PEL in digital GII transmission mode through GII transmission system using AM-PM-VSB wherein said GII transmission system includes a carrier signal having a given amplitude, comprising the steps of;
   scanning said image for producing PEL data representing white or black levels of said small size PELs of said image;
   sampling said PEL data by a sample window which is equal to said size of PEL in digital GII transmission mode, said white or black PEL data occupying a specific position in said sample window;
   detecting said position of said white or black PEL data in said sample window; and
   modulating said amplitude of said carrier signal of said GII transmission system in response to said detected position.

2. A method according to claim 1 wherein said step of scanning further includes the steps of reflecting light off said image wherein said light reflected off said image varies in amount corresponding to said scanned image and generating 1 or 0 binary image PEL data signals in accordance with said amount of said reflected light.

3. A method according to claim 2 wherein said step of sampling further includes the step of sampling a plurality of said 1 or 0 binary image PEL data signals representative of one PEL in said GII transmission mode.

4. A method according to claim 3 wherein said step of detecting includes the step of producing an amplitude signal representative of the 1 or 0 binary signals in each plurality of said 1 or 0 binary image PEL data signals.

5. A method according to claim 4 wherein said step of modulating includes the step of modulating the amplitude of said carrier signal of said GII transmission system in accordance with said amplitudes produced by said step of detecting.

6. In a GII digital transmission system for transmitting data representing PELs of an image appearing on a document or the like, in which said size of each of said PELs of said image is smaller than the size of a PEL in digital GII transmission mode through GII transmission system using AM-PM-VSB, data modifying structure comprising:
 means for scanning said image for producing PEL data representing white or black levels of said small size PELs of said image;
 sampling means connected to said scanning means for sampling said PEL data by a sample window which is equal to said size of PEL in digital GII transmission mode;
 detecting means connected to said sampling means for detecting positions of white or black PEL data in said sample window; and
 modulating means connected to said detecting means for modulating said amplitude of said carrier signal of said GII transmission system in response to said detected position.

7. Data modifying structure in a system according to claim 6 wherein said scanning means includes means for reflecting light on said image and producing binary 1 or 0 signal in accordance with said amount of said reflected light, and buffer storage means for storing said binary 1 or 0 signals.

8. Data modifying structure in a system according to claim 7 wherein said sampling means includes means for addressing said buffer storage means for sampling groups of signals from said buffer storage means, each of said groups consisting of the stored 1 and 0 signals for a plurality of said smaller size image PELs at one time.

9. Data modifying structure in a system according to claim 8 wherein said detecting means includes means for producing a plurality of signals, each of said plurality signals having an amplitude representative of the 1 bit signals and 0 bit signals in each one of said groups of said plurality of smaller size image PELs stored in said buffer storage means.

10. Data modifying structure in a system according to claim 9 wherein said modulating means includes means for modulating the amplitude of the said carrier signal of said GII transmission system in accordance with said amplitudes of said plurality of signals from said detecting means representative of said groups of 1 and 0 binary signals.

* * * * *